March 31, 1942.  I. N. THOEN  2,278,028
VEHICLE HEADLIGHT
Filed Nov. 25, 1940
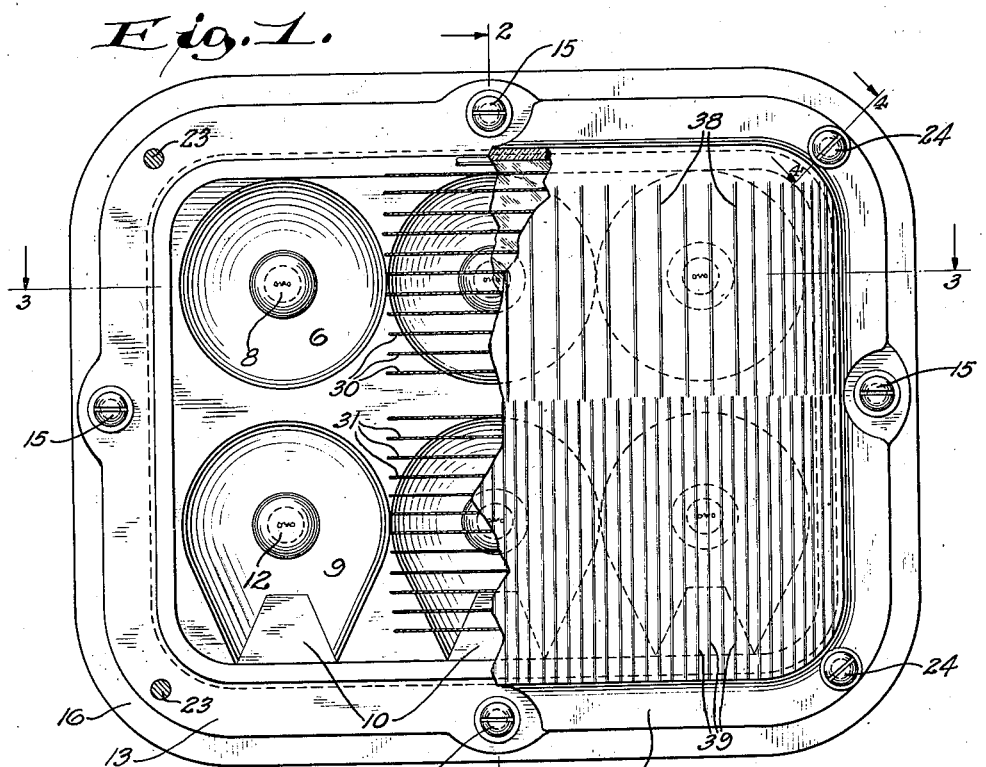
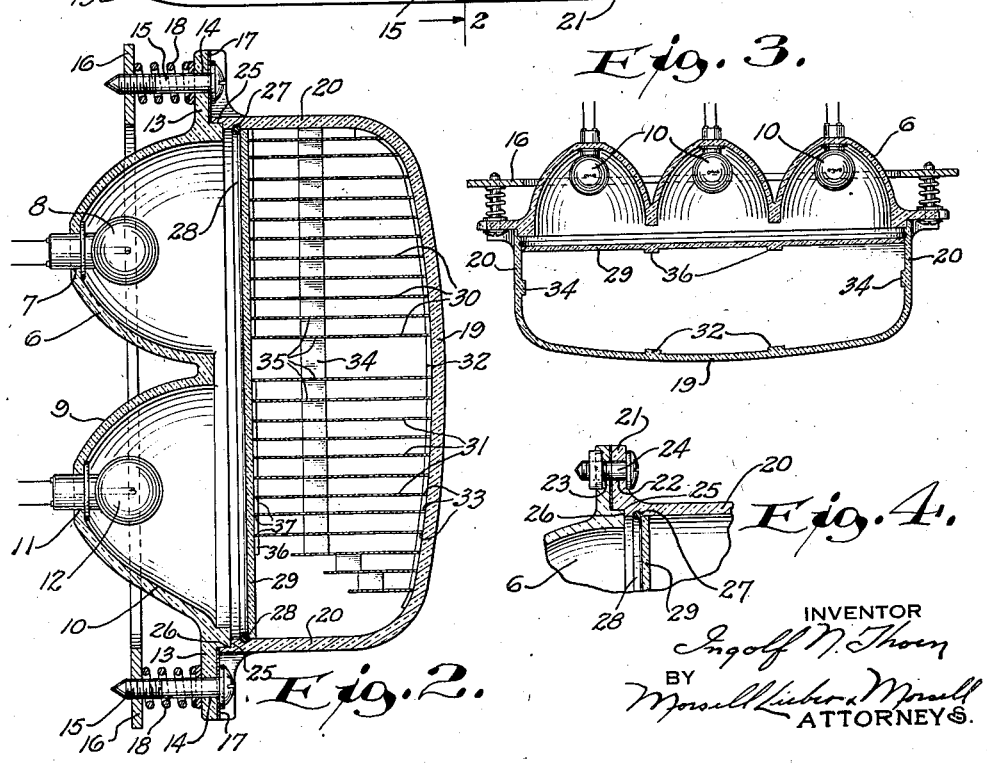

Patented Mar. 31, 1942

2,278,028

UNITED STATES PATENT OFFICE 2,278,028

VEHICLE HEADLIGHT

Ingolf N. Thoen, Milwaukee, Wis.

Application November 25, 1940, Serial No. 367,048

2 Claims. (Cl. 240—41.35)

The present invention relates generally to improvements in headlight construction, and relates more specifically to improvements in the construction and operation of anti-glare headlights for automobiles or the like.

Generally defined, an object of the invention is to provide an improved anti-glare vehicle headlight which is simple, compact, and durable in construction and which is, moreover, highly efficient in use.

Numerous attempts have been made in the past to provide non-glare headlights for automobiles which light up the highway a substantial distance ahead of the car without causing a glare to drivers of oncoming vehicles. Many of these prior constructions utilized a plurality of flat reflector plates or vanes extending rearwardly from the headlight lense, and so positioned and constructed as to permit some of the light beams to pass through in a forward direction and others to be reflected in a downward direction while preventing beams from being reflected upwardly. The majority of these prior units, however, proved very inefficient because of the loss of light rays due to the position of the reflector vanes ahead of the light source and the back reflector. Therefore, while some of the prior headlight units did away with the upward glare, they did not render sufficient light for the driver of the vehicle to get a clear vision of the road ahead.

It is, therefore, a more specific object of my invention to provide an improved headlight having a plurality of light sources, each source provided with its own reflector, and adapted to provide more numerous substantially straight beams which are capable of passing between the parallel plates of an anti-glare unit without interference therefrom whereby all of the benefits of the anti-glare unit are obtained without the usual loss of effective driving light.

Another specific object of my invention is to provide a headlight having a plurality of groups of light sources, of which each group may be utilized independently of the other as well as together for most effective lighting for either city or country driving.

Another specific object of the invention is to provide a headlight wherein diffused rays of light are reflected forwardly and downwardly with maximum efficiency, and are prevented from upward reflection with minimum loss of light.

A further object of the present invention is to provide a headlight wherein the upper portion is adapted to cast long range beams of light forwardly of the vehicle for country driving in combination with an anti-glare unit which prevents beams from being directed upwardly into the eyes of approaching drivers, there being a plurality of separate light sources operating simultaneously whereby sufficient driving light is obtained notwithstanding said anti-glare unit.

A still further specific object of my invention is to provide an anti-glare light having the rays at the lower portion thereof directed forwardly and downwardly but which, nevertheless, permits a subdued spread of light rays to be cast laterally and downwardly immediately ahead of the vehicle.

An additional specific object of the present invention is to provide a simple headlight unit which may be readily assembled and dismantled and which can be manufactured, assembled, and operated at moderate cost.

These and other specific objects and advantages of my present invention will be apparent from the following detailed description.

A clear conception of an embodiment of the several features constitute my present invention and of the mode of constructing, assembling, and utilizing anti-glare headlight units made in accordance with my improvement may be had by referring to the drawing accompanying and forming part of this specification wherein like reference characters designate the same or similar parts in the various views.

Fig. 1 is a front elevation of the improved headlight unit, several portions having been broken away to disclose various details of construction;

Fig. 2 is a central vertical section through the unit taken along the line 2—2 of Fig. 1;

Fig. 3 is a horizontal section through the unit taken along the line 3—3 of Fig. 1 and drawn to a reduced scale; and Fig. 4 is a section through a fragment of the unit taken along the line 4—4 of Fig. 1.

While the invention has been shown and described herein as being specifically applied to anti-glare headlights especially adapted for use with automobiles, it is not my desire or intent to thereby unnecessarily restrict the scope or utility of the improvement.

Referring to the drawing, the improved reflector unit comprises in general, a plurality of relatively small cup-shaped upper reflectors 6, each provided with a central socket 7 to receive a light bulb 8; and a plurality of lower reflectors 9 of substantially the same shape as the upper reflectors except that the bottom is downwardly and outwardly directed and formed with a flat area 10, each of said lower reflectors being provided with a central socket 11 for receiving a light bulb 12. The upper and lower reflectors may be manufactured of a single piece of material, preferably glass, by molding or the like, and are preferably formed with the lower reflectors angled slightly downwardly at an angle of approximately one degree with respect to the upper reflectors thereby giving a slight, approximately one degree, downward angle to the axis of the light bulbs 12. The reflectors may be formed with an integral peripheral flange 13 provided with spaced openings 14 adapted to receive bolts 15 formed for cooperation with threaded openings in the usual retaining ring 16 of the headlight casing. A sealing gasket 17 or the like is preferably provided between the heads of the bolts 15 and the flange 13, and a spring 18 may be positioned about the bolts 15 between the flange 13 and the ring 16 for constantly urging the unit away from the retaining ring.

The headlight lens is cup-shaped and is provided with a curved front wall 19, side, bottom and top walls 20 formed integral with the front wall 19 and extending rearwardly therefrom, and a vertical supporting flange 21 projecting outwardly from the side, bottom, and top walls 20 and coacting with the reflector flange 13. The flange 21 is broken away at certain points to permit access to the bolts 15 and is provided with spaced openings 22 corresponding to openings 23 in the reflector flange 13 for receiving the bolt units 24 to retain the lens in position ahead of the reflector unit. The lens is provided with a recess 25 at the extreme inner rear ends of the walls 20 adapted to snugly coact with a corner 26 of the reflector unit to center the lens and seal the unit, and is also provided with a continuous inner groove 27 adjacent the recess 25 for receiving a snap ring 28 to hold an inner reflector plate retainer 29, formed of glass, in position within the walls 20 of the main lens.

An anti-glare unit comprising a plurality of upper horizontal reflector plates 30 and lower approximately horizontal reflector plates 31 is formed for positioning within the cup-shaped lens between the front wall 19 thereof and the glass retainer 29. Elongated lugs 32 having notches 33 are formed integral with the front wall 19 of the lens, elongated lugs 34 having notches 35 are likewise formed integral with the side walls 20, and elongated lugs 36 having notches 37 are formed integral with the retainer 29; and the plates 30, 31 are adapted to snugly coact with the notches 33, 35, 37 to retain the anti-glare unit in position. While the upper plates 30 are preferably formed for disposition in a horizontal plane to permit straight light beams from the upper reflectors 6 to be cast directly therebetween for long-range vision, the lower plates 31 are preferably inclined slightly downwardly toward the front wall 19 at an angle of approximately one degree to correspond to the angle of disposition of the lower reflectors 9 permitting the straight beams reflected therefrom to be cast directly therebetween for lighting the highway a short distance in front of the vehicle. The plates 30, 31 are provided with lower reflecting surfaces but the upper surfaces are preferably opaque and non-reflecting to prevent upward reflection. To further insure against upward glare of the light beam, at least one of the plates 30 should be positioned parallel to or above the top of the reflectors 6 and at least one of the plates 31 should be positioned parallel to or above the uppermost portion of the reflectors 9. As clearly illustrated in Fig. 2, several of the lower plates 31 are preferably of gradually decreasing lengths measured from the inner face of the front wall 19 of the cup-shaped lens, thus permitting unobstructed passage of light beams from the flat areas 10 downwardly and forwardly immediately ahead of the vehicle for better short-range vision.

The front wall 19 of the cup-shaped lens may be provided with a plurality of scorings 38, 39 molded therein. These scorings 38, 39 diffuse the light beams passing through the lens to further reduce the glare, and the upper scorings 38 may be spaced wider apart than the lower scorings 39 since the beams reflected from the upper long-range reflectors 6 need not be diffused as much as the light reflected from the lower reflectors 9.

The reflector unit may be readily assembled by positioning the reflectors 6, 9 within retaining ring 16, placing the gasket 17 over the flange 13, inserting the bolts 15 through the openings 14 and springs 18, and screwing them into the threaded openings provided in the ring 16. The light bulbs 8 may then be secured within their sockets 7 and bulbs 12 within their sockets 11. The bulbs 8 are preferably wired on a single circuit in parallel, while the bulbs 12 are wired on another circuit in parallel, and a suitable switch control operable from within the vehicle may be provided whereby the upper series of lights 8 may be turned on independently of the lower set 12, and the lower set 12 may be turned on independently of the upper set 8 or both sets may be turned on simultaneously for most efficient long-range vision. The anti-glare unit may then be assembled by sliding the reflector plates 30, 31 into the notches 33, 35 of the elongated lugs 32, 34 respectively, placing the glass retainer 29 properly in position within the walls 20 with the notches 37 of the elongated lugs 36 coacting with the free ends of the plates 30, 31 and snapping the retaining ring 28 into the groove 27. The assembled anti-glare unit is then positioned ahead of the reflector unit by disposing the recess 25 of the lens over the corner 26 of the reflector unit and securing the units to each other with the bolts 24.

From the foregoing description, it will be apparent that an efficient anti-glare light is provided in which numerous straight beams of light are reflected directly between the anti-glare plates. The upper plates 30 are preferably positioned horizontally so that the straight parallel beams reflected forwardly from the upper parabolic reflectors 6 are thrown a great distance ahead of the vehicle for country driving, and the lower reflector plates 31 are positioned at a slight downward angle to permit the straight parallel beams from the similarly angled lower parabolic reflectors 9 to be thrown in a downward direction ahead of the vehicle for close range vision during city driving. The most efficient lighting for country driving is obviously obtained by having both series of lights burning simultaneously as a more intense light beam is thereby produced. The provision of individual reflectors for each light in a series is obviously very important since each parabolic reflector reflects additional straight beams and consequently there is less light lost in the anti-glare unit which is positioned ahead of the light source. The provision of the elongated walls 20 on the lens permits light to be reflected therethrough both laterally and downwardly to illuminate the highway immediately ahead of the vehicle without producing a blinding glare. Both the reflector unit and the lens may obviously be molded of glass at a relatively low cost, and a very efficient anti-glare unit which is simple, compact and durable, and which may be readily assembled, is provided.

It should be understood that it is not desired to limit the invention to the exact details of construction or to the precise mode of use herein shown and described, for various modifications within the scope of the claims may occur to persons skilled in the art.

I claim:

1. An anti-glare headlight for vehicles comprising, a plurality of upper light sources each provided with a parabolic reflector, a plurality of lower light sources each likewise provided with a parabolic reflector and being disposed below said upper light sources and reflectors at a slight angle with respect thereto, a lens positioned ahead of said upper and lower light sources, a plurality of parallel horizontally extending anti-glare plates for said upper light sources positioned within said lens and in planes parallel with the rays projected forwardly from said upper light sources, and a plurality of parallel horizontally extending anti-glare plates for said lower light sources positioned within said lens and disposed in planes parallel with the rays projected forwardly and slightly downwardly from said lower light sources, said upper and lower plates having their upper surfaces non-reflecting, and said plurality of light sources and reflectors furnishing an increased number of rays which can pass between the plates to compensate for the loss of effective light due to interference from said plates and non-reflecting surfaces.

2. An anti-glare headlight for vehicles comprising, a plurality of upper light sources each provided with a parabolic reflector, a plurality of lower light sources each likewise provided with a parabolic reflector and being disposed below said upper light sources and reflectors at a slight angle with respect thereto, a lens positioned ahead of said upper and lower light sources, a plurality of parallel horizontally extending anti-glare plates for said upper light sources positioned within said lens and in planes parallel with the rays projected forwardly from said upper light sources, and a plurality of parallel horizontally extending anti-glare plates for said lower light sources positioned within said lens and disposed in planes parallel with the rays projected forwardly and slightly downwardly from said lower light sources, said upper and lower plates having their upper surfaces non-reflecting, and said plurality of light sources and reflectors furnishing an increased number of rays which can pass between the plates to compensate for the loss of effective light due to interference from said plates and non-reflecting surfaces, some of the bottommost of said lower plates having their inner ends terminating progressively less far inwardly to permit unobstructed passage of light from the lower reflectors downwardly and forwardly immediately ahead of the vehicle.

INGOLF N. THOEN.